United States Patent [19]

Sugiura et al.

[11] 4,226,901
[45] Oct. 7, 1980

[54] METHOD FOR METALLIC FINISH COATING

[75] Inventors: Shinji Sugiura; Tadashi Watanabe; Satoru Ito, all of Hiratsuka, Japan

[73] Assignee: Kansai Paint Co., Ltd., Hyogo, Japan

[21] Appl. No.: 962,034

[22] Filed: Nov. 20, 1978

[30] Foreign Application Priority Data

Nov. 25, 1977 [JP] Japan ................................ 52/141281

[51] Int. Cl.$^2$ ............................................... B05D 3/02
[52] U.S. Cl. .............................. 427/385.5; 427/388.3; 427/407.1; 427/409; 525/162
[58] Field of Search ................................ 260/851, 856; 427/388 B, 385 R, 409, 407 R; 525/162

[56] References Cited

FOREIGN PATENT DOCUMENTS 49-15946   4/1974  Japan .
49-18126   6/1974  Japan .
49-38005  10/1974  Japan .
50-43133   4/1975  Japan .

Primary Examiner—Ronald H. Smith
Assistant Examiner—Thurman K. Page
Attorney, Agent, or Firm—Wenderoth, Lind & Ponack

[57] ABSTRACT

In a method for applying a metallic finish coat to a substrate which comprises applying a base coat composed of a metallic paint containing a thermosetting resin as a film-forming ingredient to a substrate, applying a top coat composed of a clear paint containing a thermosetting resin as a film-forming ingredient to the surface of the base coat, and heating both the base coat and top coat to cure them, the improvement wherein the film-forming ingredient of the clear paint in the top coat comprises (A) an acrylic resin having a number average molecular weight of 5,000 to 15,000 and a glass transition temperature of from 5° to 35° C. obtained by copolymerizing (a) 42 to 90 parts by weight of at least one methacrylate selected from alkyl methacrylates with the alkyl moiety having 4 to 18 carbon atoms and (b) 10 to 58 parts by weight of a monomer having an ethylenically unsaturated bond and a hydroxyl group in the molecule, the total amount of components (a) and (b) being 100 parts by weight, and (B) an aminoaldehyde resin, the weight ratio of the acrylic resin (A) to the aminoaldehyde resin (B) being from 80:20 to 65:35.

3 Claims, No Drawings

METHOD FOR METALLIC FINISH COATING

This invention relates to a method for metallic finish coating of a substrate by a two-coat one-baking process.

In top coat metallic finishes of automobiles, the "one-coat one-baking process" which involves forming a coat of a thermosetting paint containing a metallic powder and baking the as-formed coat has been frequently superseded in recent years by a "two-coat one-baking process" which comprises applying a base coat of a thermosetting paint containing a metallic powder to a substrate, thereafter applying (wet-on-wet) a top coat of a clear thermosetting paint not containing a colored pigment to the base coat, and then baking the base coat and the top coat simultaneously. The main reason for this is that while by the one-coat one-baking process, the metallic powder is attacked by acids, etc. and stains tend to form, the two-coat one-baking process gives coated films being substantially free from staining and having superior aesthetic properties.

However, since in the two-coat one-baking process the base coat and the top coat are prepared from different resins to increase gloss and prevent unevenness of a metallic finish, a difference in properties such as elasticity and the coefficient of expansion arises between the two coats, resulting frequently in the cracking and peeling of the top coat which are not seen in the one-coat one-baking process. In addition, the resulting coating has unsatisfactory water resistance and mechanical properties. It has been strongly desired therefore to remove these defects.

It is an object of this invention to provide a method for metallic finish coating by a two-coat one-baking process, which removes the aforesaid defects of conventional metallic finish coatings by the two-coat one-baking process, and gives a coating having excellent water resistance and mechanical properties without cracking or peeling of the top coat.

The present inventors made extensive investigations about thermosetting acrylic resin paints used for top coats in the two-coat one-baking process. These investigations led to the discovery that the aforesaid defects are ascribable to the composition of the acrylic resin, and that the use of a clear thermosetting paint consisting essentially of (A) an acrylic resin having a specified composition not containing styrene, styrenic monomers and lower alkyl methacrylates and specified properties and (B) an aminoaldehyde resin as a top coat can fully remove the aforesaid defects and can afford metallic finishes having excellent chemical resistance and mechanical properties without cracking or peeling of the top coat by the two-coat one-baking process.

According to the present invention, there is provided a method for applying a metallic finish coat to a substrate which comprises applying a base coat composed of a metallic paint containing a thermosetting resin as a film-forming ingredient to a substrate, applying a top coat composed of a clear paint containing a thermosetting resin as a film-forming ingredient to the surface of the base coat, and heating both the base coat and top coat to cure them, wherein the film-forming ingredient of the clear paint in the top coat comprises (A) an acrylic resin having a number average molecular weight of 5,000 to 15,000 and a glass transition temperature of from 5° to 35° C. obtained by copolymerizing (a) 42 to 90 parts by weight of at least one methacrylate selected from alkyl methacrylates with the alkyl moiety having 4 to 18 carbon atoms and (b) 10 to 58 parts by weight of a monomer having an ethylenically unsaturated bond and a hydroxyl group in the molecule, the total amount of components (a) and (b) being 100 parts by weight, and (B) an aminoaldehyde resin, the weight ratio of the acrylic resin (A) to the aminoaldehyde resin (B) being from 80:20 to 65:35.

Examples of the methacrylate (a) forming the acrylic resin (A) in the top coat include n-butyl methacrylate, i-butyl methacrylate, t-butyl methacrylate, 2-ethylhexyl methacrylate, lauryl methacrylate, tridecyl methacrylate, stearyl methacrylate and cyclohexyl methacrylate. They may be used either singly or as a mixture of two or more. If a methacrylate having an alkyl group with 3 or less carbon atoms is used, the physical properties, acid resistance and weather resistance of the resulting clear coat are deteriorated. The use of alkyl acrylates, even those having the alkyl moiety with 4 or more carbon atoms, is undesirable because it will cause a deterioration in the acid resistance and weather resistance of the resulting coating.

Examples of the monomer (b) which forms the acrylic resin are hydroxyl-containing acrylates or methacrylates such as 2-hydroxyethyl acrylate or methacrylate and hydroxypropyl acrylate or methacrylate; adducts formed between monoepoxy compounds such as an aliphatic monoglycidyl compound and α-olefin epoxide and α,β-ethylenically unsaturated carboxylic acids such as acrylic acid, methacrylic acid or itaconic acid; and adducts formed between glycidyl acrylate or methacrylate and monocarboxylic acids having no polymerizable unsaturated bond such as aliphatic, aromatic or alicyclic monocarboxylic acids having 1 to 25 carbon atoms.

The acrylic resin (A) may further contain copolymerized therewith up to 8 parts by weight of (c) an α,β-ethylenically unsaturated carboxylic acid in addition to the components (a) and (b) exemplified above. Examples of the component (c) are acrylic acid, methacrylic acid, itaconic acid and maleic acid.

Copolymerization of these components can be effected by a customary method. The proportions of the copolymerization ingredients are 42 to 90 parts by weight, preferably 70 to 88 parts by weight, of ingredient (a), 10 to 58 parts by weight, preferably 12 to 30 parts by weight, of ingredient (b), and up to 8 parts by weight, preferably 1 to 4 parts by weight, of ingredient (c), per 100 parts by weight of the ingredients (a) and (b) combined. When a paint containing a copolymerized acrylic resin having a composition outside the above-specified range is used as a top coat of a two-coat system which requires only one baking cycle, various deleterious effects are caused which will deteriorate the resulting coated film. For example, when the proportion of the component (a) is less than 42 parts by weight based on 100 parts by weight of components (a) and (b) combined (namely, when the proportion of the component (b) is larger than 58 parts by weight), the water resistance, humidity resistance and chemical resistance (especially, acid resistance) of the resulting coated film are deteriorated, and it is difficult to balance weather resistance with mechanical properties, especially flexibility. When the proportion of component (a) exceeds 90 parts by weight and therefore the proportion of component (b) is less than 10 parts by weight, the crosslinking density of the coated film is not sufficient, and its weather and solvent resistances are deteriorated. If the proportion of component (c) exceeds 8 parts by weight, the storage stability of the paint and the water resistance of the coated film are reduced.

The copolymerized acrylic resin (A) used in this invention should not contain copolymerization ingredients other than the ingredients (a), (b) and (c). In particular, a copolymerized acrylic resin derived from styrene and an alkyl methacrylate with the alkyl moiety containing not more than 3 carbon atoms will cause cracking and peeling of the top coat, and deteriorates the flexibility and water resistance of the coated film. When an acrylate ester is used as a copolymer ingredient, a top coat of poor resistance properties will result.

Furthermore, the acrylic resin (A) used in the invention should have an average molecular weight (as measured by a vapor pressure osmotic method) of 5,000 to 15,000, preferably 6,000 to 14,000, and a glass transition point (measured by a dilatometer) of 5° to 35° C., preferably 7° to 30° C. When the number average molecular weight is less than 5,000, the weather resistance of the resulting coating is insufficient, and when it exceeds 15,000, the finished coating has a poor surface appearance. When the glass transition point is lower than 5° C., the hardness of the coated film is insufficient, and its loss tends to be reduced during outdoor exposure. When the glass transition point exceeds 35° C., the rigidity of the coated film increases, and its weather resistance under greatly changeable temperature conditions is deteriorated.

The object of this invention can be fully achieved by using an acrylic resin meeting these requirements as a top coat. It has also been found that the weather resistance and other properties of the coated film can be further improved by using a specified acrylic resin whose composition and properties are within the above-specified ranges and which is prepared by copolymerizing 42 to 86 parts by weight of n-butyl methacrylate and 0 to 35 parts by weight of at least one alkyl methacrylate with the alkyl moiety having 8 to 13 carbon atoms as ingredient (a), 12 to 30 parts of ingredient (b), and 1 to 4 parts by weight of ingredient (c).

All aminoaldehyde resins generally used for thermosetting acrylic paints are feasible as the ingredient (B) of the top coat used in this invention. From the standpoint of weather resistance, a melamine-formaldehyde resin is most preferred.

The weight ratio of the acrylic resin (A) to the aminoaldehyde resin (B) in the top coat should be 80:20 to 65:35. If the proportion of the ingredient (B) is smaller than the specified limit, the crosslinking of the coated film is insufficient, and the coated film has poor weather and solvent resistance. If the proportion of ingredient (B) exceeds the specified upper limit, the mechanical properties and chemical resistance (especially acid resistance) of the resulting coated film are deteriorated.

The top coat of this invention does not particularly reqire the incorporation of a colored pigment, but as required, a surface controlling agent, a cure accelerating catalyst, an anti-cratering agent or an extender pigment may be added. Prior to use, a diluting solvent may be added.

The paint which forms a base coat in the invention is a metallic paint containing a thermosetting resin as a film-forming ingredient. In the present invention, the "metallic paint" denotes a paint which by the addition of, for example, a metal powder such as an aluminum or copper powder, or a mica powder, will give a coated film having a metallic appearance. Many kinds of metallic paints have been known previously.

The base coat may be formed from any metallic paint which contains a heat-curable resin as a film-forming ingredient. Thermosetting acrylic resins are most preferred in view of their ease of coating and good weather resistance. The base coat paint may be a solvent-type paint containing an organic solvent as a medium, or a nonaqueous dispersion paint. The metallic powder to be added to the base coat and the colored pigment optionally added may be those used in conventional paints. For example, the metallic powder includes aluminum powder which is most common, copper powder, and mica powder. The colored pigment may be ordinary pigments for paints.

The metallic finish in accordance with this invention is obtained by a two-coat one-baking process comprising first diluting the base coat by a solvent to a viscosity (Ford cup #4/20° C.) of 10 to 30 seconds, and coating the diluted base coat on a bare or primed substrate (e.g., steel sheet or aluminum sheet) to a dry film thickness of 10 to 30 microns. The coating is performed by a spray coating or electrostatic coating technique. The base coat formed is allowed to stand at room temperature for several minutes, and a top coat thinned to a viscosity (Ford cup #4/20° C.) of 20 to 40 seconds is coated (wet-on-wet) by spray coating or electrostatic coating to a dry film thickness of 20 to 50 microns. The resulting coat is allowed to stand at room temperature for several minutes, and heated at 120° to 160° C. for 10 to 30 minutes to cure the base coat and the top coat simultaneously, thereby forming a metallic finish intended by the invention.

The following Examples and Comparative Examples illustrate the present invention in more detail. In these examples, all parts and percentages are by weight.

EXAMPLE A

Preparation of an acrylic resin solution for a top coat (1) Preparation of acrylic resin solution A An ordinary apparatus for producing an acrylic resin equipped with a stirrer, thermometer, reflux condenser and dropping tank was charged with 67 parts of Swasol #1000 (an aromatic solvent, a trademark for a product of Maruzen Sekiyu Kagaku Kabushiki Kaisha, Japan), and when the temperature reached 132° C., a monomeric mixture consisting of 60 parts of n-butyl methacrylate, 19 parts of 2-ethylhexyl methacrylate, 18 parts of 2-hydroxyethyl methacrylate, 3 parts of methacrylic acid and 1.9 parts of α,α'-azobisisobutyronitrile was added dropwise over the course of 3 hours.

After the addition of the monomeric mixture, the mixture was stirred for 1 hour while maintaining the temperature of the reactor at 132° C. Then, a mixture consisting of 10 parts of Swasol #1000, and 0.8 part of 2,2'-azobis-2,4-dimethylvaleronitrile was added over the course of 2 hours. The reaction was performed for 2 hours at 132° C., and then 3 parts of Swasol #1000 and 15 parts of n-butanol were added to prepare an acrylic resin solution A. The solid resin of the acrylic resin solution A had a number average molecular weight (measured by a vapor pressure osmotic method) of 10,200 and a glass transition point (measured by a dilatometer) of 20° C. The solution had a solids concentration of 50.0%, and a viscosity (measured by a Gardner bubble viscosimeter 25° C.) of K.

(2) Preparation of acrylic resin solutions B to K

Acrylic resin solutions B to K were prepared by reacting the ingredients shown in Table 1 in the same way as in the preparation of the acrylic resin solution A. The number average molecular weights of the acrylic resins were controlled by varying the reaction temperature and the amount of $\alpha,\alpha'$-azobisisobutyronitrile added. The number average molecular weights and glass transition points of the resin portions of the acrylic resin solutions, and the solids concentrations and the Gardner viscosities (25° C.) of the solutions are also shown in Table 1.

Table 1

| Monomers | Acrylic resin solutions | | | | | | | | | | |
|---|---|---|---|---|---|---|---|---|---|---|---|
| | A | B | C | D | E | F | G | H | I | J | K |
| n-Butyl methacrylate | 60 | 47 | 50 | 32 | 44 | 53 | 53 | 37 | 34 | 43 | 64 |
| i-Butyl methacrylate | | | | | | | | 40 | | | |
| 2-Ethylhexyl methacrylate | 19 | 23 | 27 | 25 | 25 | 25 | 25 | | 30 | 25 | |
| Lauryl methacrylate | | 10 | | | | | | | 15 | | |
| 2-Hydroxyethyl methacrylate | 18 | | 20 | | 18 | 20 | 20 | 20 | | | 18 |
| 2-Hydroxy acrylate | | 15 | | 20 | | | | | 18 | 15 | |
| Methacrylic acid | 3 | 3 | | 3 | 3 | | | 3 | 3 | | 3 |
| Acrylic acid | | | 3 | | | 2 | 2 | | | 2 | |
| Styrene | | | | 20 | 10 | | | | | | |
| Methyl methacrylate | | | | | | | | | | 15 | |
| n-Butyl acrylate | | | | | | | | | | | 15 |
| Solids concentration (wt. %) | 50.0 | 49.8 | 50.1 | 50.5 | 50.3 | 49.9 | 50.2 | 50.3 | 49.6 | 50.1 | 50.0 |
| Gardner bubble viscosity at 25° C. | K | L | G | N | M | G | uv | P | G | O | H |
| Number average molecular weight | 10200 | 13000 | 6100 | 14200 | 6800 | 4100 | 21000 | 10500 | 9900 | 10000 | 10100 |
| Glass transition point (°C.) | 20 | 7 | 16 | 17 | 20 | 11 | 19 | 40 | −2 | 10 | 10 |

EXAMPLE B

Preparation of an acrylic resin solution L for a base coat

Styrene (15 parts), 20 parts of methyl methacrylate, 30 parts of ethyl acrylate, 21 parts of n-butyl methacrylate, 12 parts of 2-hydroxyethyl methacrylate and 2 parts of acrylic acid were polymerized in xylene using $\alpha,\alpha'$-azobisisobutyronitrile as a polymerization initiator to form an acrylic resin solution L having a resin content of 50% and Gardner viscosity of $Z_1$.

EXAMPLE C

Preparation of a nonaqueous thermosetting resin dispersion M for a base coat

Seventy parts of a mixture of vinyl monomers consisting of 30% of styrene, 30% of methyl methacrylate, 23% of 2-ethylhexyl acrylate, 15% of 2-hydroxyethyl acrylate and 2% of acrylic acid was dispersion-polymerized in a customary manner in n-heptane using 30 parts of a copolymer derived from 30% of an adduct of poly-12-hydroxystearic acid and glycidyl methacrylate, 10% of styrene, 20% of methyl methacrylate, 17% of 2-ethylhexyl methacrylate, 20% of 2-hydroxyethyl methacrylate and 3% of acrylic acid. Thus, a nonaqueous thermosetting resin dispersion M having a resin content of 54% was produced.

EXAMPLE D

Preparation of a base coat (1) Preparation of base coat $B_1$

A solvent-type base coat was prepared by using the acrylic resin solution L in accordance with the following formulation.

| | |
|---|---|
| 50% Acrylic resin solution L | 160 parts |
| UVAN 20SE*[1] | 33 parts |
| ALPASTE #1109MA*[2] | 12 parts |
| Organic yellow pigment*[3] | 0.01 part |
| Carbon black*[4] | 0.005 part |

*[1]Melamine resin (solids content 60% by weight), a trademark of Mitsui Toatsu Chemicals, Inc.
*[2]ALPASTE #1109MA, a product of Toyo Aluminum Co., Ltd.
*[3]Irgazin Yellow 3RLTN, a product of Ciba-Geigy.
*[4]NeO Spectra Beads AG, a product of Columbia Carbon Co., Ltd.

The base coat was then thinned to a viscosity (Ford cup #4/20° C.) of 14 seconds by a mixture consisting of 40 parts of toluene, 30 parts of Swasol #1000 (a product of Maruzen Sekiyu Kabushiki Kaisha), 20 parts of butyl acetate and 10 parts of n-butanol.

(2) Preparation of base coat $B_2$

A base coat $B_2$ was prepared in accordance with the following formulation using the nonaqueous thermosetting resin dispersion M.

| | |
|---|---|
| 54% Nonaqueous thermosetting resin dispersion | 148 parts |
| MELAN #28*[5] | 33.3 parts |
| ALPASTE ·1109MA*[2] | 12 parts |
| Organic yellow pigment*[3] | 0.01 part |
| Carbon black*[4] | 0.005 part |

*[5]Melamine resin (solids content 60% by weight), a product of Hitachi Chemical Co., Ltd.

The base coat was then thinned to a viscosity of 14 seconds (Ford cup #4/20° C.) by using a mixture of Naphthesol #150 (a hydrocarbon solvent produced by Nisseki Kagaku Kabushiki Kaisha, Japan), 60 parts of cellosolve acetate and 10 parts of carbitol acetate to form a base coat $B_2$.

EXAMPLE E (1) Preparation of top coat $T_1$

A top coat $T_1$ was prepared by dispersing the following ingredients.

| | |
|---|---|
| Acrylic resin solution A | 140 parts |
| UVAN 20 SE*[1] | 50 parts |
| Raybow No. 3*[6] | 0.1 part |

*[6]A silicone oil diluted to 1% by weight by xylene, a product of Raybow Chemical Co., Ltd.

The top coat was then thinned with Swasol #1000 to a viscosity of 32 seconds (Ford cup #4/20° C.) to form a sprayable top coat $T_1$.

(2) Preparation of top coats $T_2$ to $T_{14}$

Top coats $T_2$ to $T_{14}$ was prepared in the same way as in the top coat $T_1$ according to the recipes shown in Table 2.

room temperature for 3 minutes. Then, the top coat $T_1$ was coated by an air spray gun (F-5), and allowed to stand for 10 minutes. Then, both the top coat and the base coat were cured by heating at 150° C. for 20 mi- Table 2

| Ingredients | | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ |
|---|---|---|---|---|---|---|---|---|---|---|---|---|---|---|---|
| Acrylic resin solution | A | 140 | | | 140 | | | | | | | | | 140 | 140 |
| " | B | | 140 | | | | | | | | | | | | |
| " | C | | | 140 | | | | | | | | | | | |
| " | D | | | | | 140 | | | | | | | | | |
| " | E | | | | | | 140 | | | | | | | | |
| " | F | | | | | | | 140 | | | | | | | |
| " | G | | | | | | | | 140 | | | | | | |
| " | H | | | | | | | | | 140 | | | | | |
| " | I | | | | | | | | | | 140 | | | | |
| " | J | | | | | | | | | | | 140 | | | |
| " | K | | | | | | | | | | | | 140 | | |
| UVAN 20SE | | 50 | 50 | 50 | 62.8 | 50 | 50 | 50 | 50 | 50 | 50 | 50 | 50 | 20.6 | 77.8 |
| Acrylic resin/melamine resin ratio (solids content) | | 70/30 | 70/30 | 70/30 | 65/35 | 70/30 | 70/30 | 70/30 | 70/30 | 70/30 | 70/30 | 70/30 | 70/30 | 85/15 | 60/40 |

EXAMPLE 1

A polybutadiene-type electrodeposition primer was electrodeposited to a dry film thickness of about 20 microns on a 0.8 mm thick dull steel sheet treated with zinc phosphate, and baked at 170° C. for 20 minutes. The coated steel sheet was polished by a #400 sand paper, and degreased by wiping it with petroleum benzin. Then, an intermediate-coat surfacer for automobiles was air sprayed on it to a dry film thickness of about 25 microns, baked at 140° C. for 30 minutes, polished in water with a #400 sand paper, dried to remove water, and then degreased with petroleum benzin to form a test substrate.

The base coat $B_1$ was coated on the test substrate by using an air spray gun (F-5, a trademark for a product of Meiji Kikai Seisakusho, Japan), and allowed to stand at nutes in an electric oven to afford a coating having a 60° specular gloss of 92 and a good metallic appearance.

The resulting coated steel sheet was designated as coated steel sheet No. 1, and then tested for the properties of the coating. The results are shown in Table 3.

EXAMPLES 2 TO 4 AND COMPARATIVE EXAMPLES 1 TO 10

Coated steel sheets Nos. 2 to 14 were prepared in the same way as in the preparation of the coated steel sheet No. 1. Coated steel sheets Nos. 2 to 4 correspond to Examples 2 to 4, and coated steel sheets Nos. 5 to 14 correspond to Comparative Examples 1 to 10. The types of the base coat and the top coat and the surface appearances, 60° specular gloss, acid resistance, and weather resistance of the resulting coatings are shown in Table 3.

Table 3

| | Coated steel sheet No. | Base coat | Top coat | Appearance of the coated surface | 60° specular gloss | Pencil hardness (*1) | Erichsen (mm) (*2) | Impact strength (cm) (*3) | Humidity resistance (*4) | Acid resistance, spotted with 10% sulfuric acid (*5) | Accelerated weathering, after 3000-hour exposure to a sunshine type weather-o-meter Appearance of the coating | 60° specular gloss |
|---|---|---|---|---|---|---|---|---|---|---|---|---|
| Example | | | | | | | | | | | | |
| 1 | 1 | $B_1$ | $T_1$ | Good | 92 | F | 4.0 | 30 | No change | No change | No change | 77 |
| 2 | 2 | $B_1$ | $T_2$ | Good | 91 | H | 4.3 | 45 | No change | No change | No change | 75 |
| 3 | 3 | $B_2$ | $T_3$ | Good | 91 | H | 3.8 | 35 | No change | No change | No change | 65 |
| 4 | 4 | $B_1$ | $T_4$ | Good | 91 | 2H | 3.2 | 25 | No change | No change | No change | 78 |
| Comparative Example | | | | | | | | | | | | |
| 1 | 5 | $B_1$ | $T_5$ | Good | 97 | F | 3.5 | 30 | No change | No change | Cracking occurred | 32 |
| 2 | 6 | $B_1$ | $T_6$ | Good | 94 | H | 3.0 | 25 | No change | No change | Cracking occurred | 28 |
| 3 | 7 | $B_1$ | $T_7$ | Good | 90 | B | 2.8 | 20 | No change | Discolored | Cracking occurred | 30 |
| 4 | 8 | $B_1$ | $T_8$ | Poor | 89 | H | 3.6 | 30 | No change | No change | No change | 74 |
| 5 | 9 | $B_1$ | $T_9$ | Good | 93 | 2H | 0.6 | 15 | No change | No change | Cracking occurred | 65 |
| 6 | 10 | $B_1$ | $T_{10}$ | Good | 90 | B | 4.2 | 40 | No change | No change | No change | 40 |
| 7 | 11 | $B_1$ | $T_{11}$ | Good | 92 | H | 1.0 | 15 | No change | Blister occurred | No change | 70 |

Table 3-continued

| Coated steel sheet No. | Base coat | Top coat | Appearance of the coated surface | 60° specular gloss | Pencil hardness (*1) | Erichsen (mm) (*2) | Impact strength (cm) (*3) | Humidity resistance (*4) | Acid resistance, spotted with 10% sulfuric acid (*5) | Accelerated weathering, after 3000-hour exposure to a sunshine type weather-o-meter | |
|---|---|---|---|---|---|---|---|---|---|---|---|
| | | | | | | | | | | Appearance of the coating | 60° specular gloss |
| 8 | 12 | $T_{12}$ | Good | 91 | HB | 4.5 | 40 | No change | Blister occurred | Cracking occurred | 41 |
| 9 | 13 | $B_1$ $T_{13}$ | Good | 92 | B | 3.1 | 30 | Blister occurred | No change | Cracking occurred | 29 |
| 10 | 14 | $B_1$ $T_{14}$ | Good | 93 | 2H | 0.5 | 15 | No change | Blister occurred | No change | 76 |

(*1) Pencil hardness: The coating is scratched by pencils (Mitsubishi Uni, a trademark) having different hardness in a room held at 20° C. and a relative humidity of 75%, and the maximum pencil hardness which does not cause injury to the coating is determined.
(*2): Erichsen: Measured in accordance with JIS-2 2247. Larger values show higher flexibility.
(*3): Impact strength: Du Pont impact testing. 0 = ½", 500 g
(*4): Humidity resistance: The sample is allowed to stand for 72 hours in a humidity resistance testing box maintained at 50° C. and 100% RH, and then the appearance of the coating is observed.
(*5): Acid resistance: The coated steel sheet is spotted with about 2 ml of 10% sulfuric acid, and the test sheet is allowed to stand indoors for 24 hours at 20° C. and 75% RH and washed with water. Then, the appearance of the coating is observed.

In Comparative Examples 1 and 2, acrylic resins containing styrene were used as a top coat, and the coatings had poor weather resistance.

In Comparative Example 3, an acrylic resin having a lower molecular weight than the specified limit was used as a top coat, and the coatings had poor weather resistance and deteriorated acid resistance and mechanical properties (Erichsen and impact strength).

In Comparative Example 4, an acrylic resin having a higher molecular weight than the specified limit was used as a top coat. The coating had good properties, but its appearance (image gloss) was poor.

In Comparative Example 5, an acrylic resin having a higher glass transition point than the specified limit was used as a top coat. The coating had poor weather resistance and degraded mechanical properties.

In Comparative Example 6, an acrylic resin having a lower glass transition point than the specified limit was used as a top coat. The coating had a low hardness and its gloss decreased greatly in the accelerated weathering test.

In Comparative Example 7, 1 an acrylic resin containing methyl methacrylate was used as the top coat. The coating had inferior mechanical properties and acid resistance.

In Comparative Example 8, an acrylic resin containing n-butyl acrylate was used as a top coat. The coating had poor weather and acid resistance.

In Comparative Example 9, the amount of the melamine resin in the top coat was less than the specified limit. The curing of the top coat was insufficient, and therefore, the coating had low hardness and poor humidity and weather resistance.

In Comparative Example 10, the amount of the melamine resin in the top coat was larger than the specified limit. The coating had poor mechanical properties and acid resistance.

COMPARATIVE EXAMPLE 11

The same base coat as used in Example 1 was coated on the same substrate as in Example 1 in the same way as in Example 1, and baked at 140° C. for 30 minutes. Then, the same top coat as used in Example 1 was baked at 140° C. for 20 minutes. The resulting test sheet was subjected to the same tests as in Example 1. In the 3000-hour accelerated weathering test by a sunshine type weather-o-meter, cracks occurred in the coating, and the coating had a specular gloss of 53. It is clear from the results of this comparative test that the top coat in accordance with this invention exhibits the unique operation and results only when applied by a two-coat one-baking process.

What we claim is:

1. In a method for applying a metallic finish coat to a substrate which comprises applying a base coat composed of a metallic paint containing a thermosetting resin as a film-forming ingredient to a substrate, applying a top coat composed of a clear paint containing a thermosetting resin as a film-forming ingredient to the surface of the base coat, and heating both the base coat and top coat to cure them, the improvement wherein the top coat consists essentially of (A) an acrylic resin having a number average molecular weight of 5,000 to 15,000 and a glass transition temperature of from 5° to 35° C. obtained by copolymerizing (a) 42 to 90 parts by weight of at least one methacrylate selected from alkyl methacrylates with the alkyl moiety having 4 to 18 carbon atoms and (b) 10 to 58 parts by weight of a monomer having an ethylenically unsaturated bond and a hydroxyl group in the molecule, the total amount of components (a) and (b) being 100 parts by weight, and (B) an aminoaldehyde resin, the weight ratio of the acrylic resin (A) to the aminoaldehyde resin (B) being from 80:20 to 65:35.

2. In a method for applying a metallic finish coat to a substrate which comprises applying a base coat composed of a metallic paint containing a thermosetting resin as a film-forming ingredient to a substrate, applying a top coat composed of a clear paint containing a thermosetting resin as a film-forming ingredient to the surface of the base coat, and heating both the base coat and top coat to cure them, the improvement wherein the top coat consists essentially of (A) an acrylic resin having a number average molecular weight of 5,000 to 15,000 and a glass transition temperature of from 5° to 35° C. obtained by copolymerizing (a) 42 to 90 parts by weight of at least one methacrylate selected from alkyl methacrylates with the alkyl moiety having 4 to 18 carbon atoms, (b) 10 to 58 parts by weight of a monomer having an ethylenically unsaturated bond and a hydroxyl group in the molecule, the total amount of components (a) and (b) being 100 parts by weight, and (c) up to 8 parts by weight, per 100 parts by weight of the ingredients (a) and (b), of an α,β-ethylenically unsaturated carboxylic acid, and (B) an aminoaldehyde resin, the weight ratio of the acrylic resin (A) to the aminoaldehyde resin (B) being from 80:20 to 65:35.

3. The method of claim 2 wherein the acrylic resin is a copolymer derived from the ingredient (a) composed of 42 to 86 parts by weight of n-butyl methacrylate and 0 to 35 parts by weight of an alkyl methacrylate with the alkyl moiety having 8 to 13 carbon atoms, 12 to 30 parts by weight of the ingredient (b), and 1 to 4 parts by weight of the ingredient (c).

* * * * *